(12) United States Patent
Keita et al.

(10) Patent No.: US 8,336,395 B2
(45) Date of Patent: Dec. 25, 2012

(54) SENSOR WITH MICROMECHANICAL CONSTRUCTION

(75) Inventors: Mamadi Keita, Basel (CH); Christian Schütze, Basel (CH); Jenish Gheewala, Reinach (CH)

(73) Assignee: Endress + Hauser Flowtec AG, Reinach (CH)

( * ) Notice: Subject to any disclaimer, the term of this patent is extended or adjusted under 35 U.S.C. 154(b) by 170 days.

(21) Appl. No.: 12/461,404

(22) Filed: Aug. 11, 2009

(65) Prior Publication Data

US 2010/0043569 A1    Feb. 25, 2010

(30) Foreign Application Priority Data

Aug. 21, 2008 (DE) .......................... 10 2008 039 045

(51) Int. Cl.
*G01F 1/84* (2006.01)
(52) U.S. Cl. .................................. 73/861.357
(58) Field of Classification Search .................. None
See application file for complete search history.

(56) References Cited

U.S. PATENT DOCUMENTS

| | | | | |
|---|---|---|---|---|
| 5,796,011 A * | 8/1998 | Keita et al. | ............... | 73/861.357 |
| 6,360,614 B1 * | 3/2002 | Drahm et al. | ............ | 73/861.357 |
| 6,477,901 B1 * | 11/2002 | Tadigadapa et al. | ..... | 73/861.352 |
| 6,494,106 B1 * | 12/2002 | Cage et al. | ............... | 73/861.357 |
| 6,647,778 B2 | 11/2003 | Sparks | | |
| 6,705,172 B1 * | 3/2004 | Deppe et al. | ............ | 73/861.355 |
| 6,748,813 B1 * | 6/2004 | Barger et al. | ............ | 73/861.355 |
| 6,883,387 B2 * | 4/2005 | Bitto et al. | ............... | 73/861.355 |
| 6,935,010 B2 | 8/2005 | Tadigadapa et al. | | |
| 7,059,176 B2 | 6/2006 | Sparks | | |
| 7,228,735 B2 | 6/2007 | Sparks et al. | | |
| 7,351,603 B2 | 4/2008 | Sparks et al. | | |
| 7,381,628 B2 | 6/2008 | Sparks et al. | | |
| 2003/0200803 A1 * | 10/2003 | Platt | ......................... | 73/504.02 |
| 2006/0010964 A1 | 1/2006 | Sparks et al. | | |
| 2006/0175303 A1 | 8/2006 | Sparks et al. | | |
| 2007/0151335 A1 | 7/2007 | Sparks et al. | | |
| 2007/0157739 A1 | 7/2007 | Sparks | | |
| 2007/0180929 A1 * | 8/2007 | Rieder et al. | ................ | 73/861.17 |
| 2008/0214978 A1 | 9/2008 | Sparks et al. | | |
| 2008/0250871 A1 * | 10/2008 | Rieder et al. | ............ | 73/861.357 |

FOREIGN PATENT DOCUMENTS

| | | |
|---|---|---|
| DE | 102006029443 | 1/2008 |
| GB | 2 221 302 | 1/1990 |
| WO | WO 2007/147786 | 12/2007 |

OTHER PUBLICATIONS

Micromechanical Gyroscope Fini-Element Analysis by T.G. Nesterenko et al. (IEEE A&E Systems Magazine Sep. 2008); pp. 28-30.*

* cited by examiner

*Primary Examiner* — Harshad R Patel
(74) *Attorney, Agent, or Firm* — Bacon & Thomas, PLLC

(57) ABSTRACT

Measuring transducer of the vibration type for measuring a mass flow of a flowing medium. The measuring transducer includes two straight measuring tubes for conveying the medium, wherein the measuring tubes are arranged in parallel to one another and the measuring transducer is embodied with micromechanical construction. The measuring transducer of the vibration type of the invention permits reliable measurement of the smallest mass flows of a flowing medium in the form of, for example, a liquid or a gas.

16 Claims, 2 Drawing Sheets

SENSOR WITH MICROMECHANICAL CONSTRUCTION

The invention relates to a measuring transducer of vibration type for measuring mass flow of a flowing medium.

TECHNICAL FIELD

The invention relates to a measuring transducer of the vibration type for measuring mass flow of a flowing medium.

BACKGROUND DISCUSSION

For ascertaining mass flow of a medium, for example, a liquid and/or a gas, flowing in a pipeline, often, measuring devices are used, which are embodied as Coriolis mass flow meters and which, by means of a measuring transducer of the vibration type and operating and evaluating electronics attached thereto, induce Coriolis forces in the flowing medium and produce a measurement signal derived from these forces. Measuring devices of such type, utilizing a measuring transducer of the vibration type, have been known for a long time and have established themselves very well in industrial applications.

Known from the state of the art are various implementations of Coriolis mass flow meters having, in each case, a measuring transducer of the vibration type, wherein the measuring transducer comprises a straight measuring tube vibrating during operation and serving to convey the medium, and wherein the measuring tube communicates with the pipeline via an inlet side, inlet tube piece and an outlet side, outlet tube piece. Additionally, such implementations include: an exciter arrangement, which excites the measuring tube, during operation, by means of at least one electromechanical, especially electrodynamic, oscillation exciter acting thereon, to execute bending oscillations; and a sensor arrangement, which is equipped with oscillation pickups, especially electrodynamic oscillation pickups, for at least pointwise registering of inlet side and outlet side oscillations of the measuring tube and for producing electrical sensor signals influenced by the mass flow.

Straight measuring tubes, when excited to execute bending oscillations according to a first eigenoscillation form, the so-called driven, or, also, wanted, mode, effect Coriolis forces in the through flowing medium. The Coriolis forces lead, in turn, to bending oscillations coplanar with the excited bending oscillations according to a second eigenoscillation form of higher and/or lower order, the so-called Coriolis mode, superimposed on the excited bending oscillations, such that the oscillations registered on the inlet side and on the outlet side by means of the sensor arrangement exhibit a measurable phase difference dependent also on the mass flow.

Usually, the measuring tubes of measuring transducers of a such type, especially measuring transducers installed in Coriolis mass flow meters, are excited in the wanted mode to an instantaneous resonance frequency of the first eigenoscillation forms, especially at an oscillation amplitude controlled to be constant. Since this resonance frequency depends especially also on the instantaneous density of the medium, besides the mass flow, at least also the density of the flowing media can be directly measured by means of conventional Coriolis mass flow meters.

In order to achieve a mechanically balanced system, often two parallel measuring tubes are provided, which are excited to execute oscillations of opposite phase. Measuring transducers of the vibration type of such kind with two measuring tubes arranged in parallel are known, for example, from U.S. Pat. No. 4,768,385 or DE 34 43 234 A1.

Measuring transducers of the vibration type known from the state of the art often have a minimum tube diameter of 1 mm, when very small flows are to be measured. In many areas of application, such as, for example, biotechnology, chemistry or medical technology, however, it is often necessary to measure yet smaller mass flow, which, as a result, requires a yet smaller tube diameter of significantly less than 1 mm, in order to achieve a signal having an acceptable signal to noise ratio.

SUMMARY OF THE INVENTION

As a result, it is an object of the invention to provide a measuring transducer of the vibration type, with which a very small mass flow can be reliably measured.

The object of the invention is achieved by a measuring transducer of the vibration type for measuring mass flow of a flowing medium, wherein two straight measuring tubes are provided for conveying the medium, wherein the measuring tubes are arranged in parallel with one another and the measuring transducer is embodied with a micromechanical construction.

According to the invention, thus, a measuring transducer of the vibration type is provided for measuring a mass flow of a flowing medium, such as, for example, a liquid or a gas, and permitting reliable measurement of very small mass flow. Thus, the measuring transducer of the vibration type can, on the basis of the micromechanical construction, exhibit a free lumen in each of the two measuring tubes in the range of some $\mu m^r$. Preferably, the measuring transducer of the vibration type of the invention is manufacturable in a micro-electromechanical system (MEMS) manufacturing process, such as, for example, PolyMUMPS or Microbuilder, on a silicon substrate or a glass substrate.

According to a preferred further development of the invention, it is provided that the measuring tubes are joined at their ends with coupling pieces and connected with a pipeline. In the above mentioned, preferred, MEMS manufacturing process, in which the measuring transducer of the vibration type is manufacturable by means of a wafer bonding method, the coupling pieces can be etched into the wafers or be manufactured by means of anodic bonding.

In a further preferred embodiment of the invention, it is provided that the measuring tubes are mounted oscillatably to the two coupling pieces. In such case, the spring constants of the oscillatable measuring tubes can be influenced by the cross sections of the measuring tubes. This means, especially, that, by an enlargement of the cross section of the measuring tubes, the spring constant of the oscillatable measuring tubes is increased.

In an alternative, preferred embodiment of the invention, it is provided that the coupling piece is embodied as a reservoir. Very especially preferred is that the coupling pieces at both ends of the measuring tubes are embodied as reservoir. An embodiment of the coupling piece as a reservoirs is especially advantageous, since thermal expansion, especially due to a temperature gradient in the measuring transducer, can be reduced, in order to decrease stress in the measuring tubes brought about by the thermal expansion.

In a further, preferred form of embodiment of the invention, an oscillation exciter is provided, wherein the oscillation exciter is arranged centrally on the measuring tube and embodied in such a way, that the measuring tube is caused to execute lateral oscillations. Quite especially preferred is when two oscillation exciters are provided, wherein the first oscillation exciter is arranged centrally on the first measuring tube in such a manner and the second oscillation exciter is arranged centrally on the second measuring tube in such a manner, that the first oscillation exciter is arranged on the one side of the measuring tubes and the second oscillation exciter is arranged on the other side of the measuring tubes, wherein the two oscillation exciters and the two measuring tubes are arranged in a plane. Furthermore, it is preferred, that the lateral oscillations of the first measuring tube, which is caused to execute oscillations by the first oscillation exciter, are of opposite phase relative to the lateral oscillations of the second measuring tube, which is caused to execute oscillations by the second oscillation exciter.

Furthermore, it is provided according to an alternative embodiment of the invention, that the oscillation exciters are embodied as electrostatic comb drives. The amplitude of the lateral oscillations can be increased, on the one hand, by increasing the number of teeth of the comb drive or by increasing the voltage applied to the electrostatic drive. In order to achieve an optimum power efficiency of the measuring transducer and a maximum lateral oscillatory deflection of the measuring tubes, preferably a sinusoidal voltage is applied to the oscillation exciters, so that the measuring tubes are caused to oscillate at their resonance frequency and with opposite phase, in order to achieve a balanced system. Moreover, the oscillation exciters can be embodied also as piezoelectric drives.

In another embodiment of the invention, it is preferred to provide connecting means secured to the two measuring tubes and connecting them together for establishing the oscillatable length of the measuring tubes and to arrange the connecting means in an end region of the measuring tubes.

Quite especially, it is preferred to arrange a first connecting means in one end region of the measuring tubes and a second connecting means in another end region of the measuring tubes.

Furthermore, a damping system is provided for influencing the stiffness of the measuring tubes. A damping system of such type is additionally advantageous during transport of the measuring transducer, since possible damage to the measuring tubes can be prevented thereby. Preferably, a first damping system is connected with a first measuring tube in such a manner and a second damping system is connected with a second measuring tube in such a manner that the two measuring tubes, the first damping system and the second damping system are arranged in a plane, wherein the measuring tubes are arranged between the first damping system and the second damping system.

In a further embodiment of the invention, it can be provided that the damping system is arranged in such a manner in the central region of the measuring tube that a first part of the damping system is arranged on the one side of the oscillation exciter on the measuring tube and a second part of the damping system is arranged on the other side of the oscillation exciter on the measuring tube. In other words, a damping system is provided, which is preferably arranged centrally on the measuring tube, wherein a first part of the damping system and a second part of the damping system are arranged symmetrically about the oscillation exciter likewise preferably centrally arranged on the measuring tube. Furthermore, it is preferred that the first part of the damping system, the second part of the damping system, the measuring tube and the oscillation exciter are arranged in a plane.

Basically, the damping system, which is preferably embodied as a first part of the damping system and a second part of the damping system, can be structured in any way. In a preferred further development of the invention, it is, however, provided that the first part of the damping system and the second part of the damping system comprise, in each case, two mutually spaced, parallel plates, wherein the plates are connected with the measuring tube at one end in such a manner that the plates are arranged parallel to the measuring tube, and wherein the plates are connected at another end with a region arranged secure against oscillation relative to the measuring tube. In other words, the first part of the damping system and the second part of the damping system are preferably embodied in the form of two mutually spaced, parallel leaf springs, wherein the leaf springs are connected at the one end with the measuring tube in such a manner that the leaf springs are arranged parallel to the measuring tube, and the leaf springs are connected at the other end with a region, for example the silicon substrate, secure against oscillation relative to the measuring tube. In this way, through the spring constants of the leaf springs, the stiffness of the measuring tubes, which are arranged oscillatably and which can be caused by the oscillation exciter to execute lateral oscillations, can be varied.

Basically, any oscillation pickup can be provided. In an especially preferred embodiment of the invention, however, it is provided that at least one oscillation pickup is provided, which is embodied in the form of a comb structure with a capacitive sensor.

Furthermore, in another preferred form of embodiment of the invention, a first oscillation pickup and a second oscillation pickup are provided, wherein the first oscillation pickup is arranged on the measuring tube preferably centrally between the one end of the measuring tube and the oscillation exciter, and the second oscillation pickup is arranged centrally between the oscillation exciter and the other end of the measuring tube. Furthermore, for improving the signal to noise ratio of the capacitive sensors, the number of teeth of the comb structure of the oscillation pickup can be increased. An improvement of the signal to noise ratio can additionally be achieved by increasing the length of the measuring tube, in order, in this way, also to increase the separation between the first oscillation pickup and the second oscillation pickup.

In another embodiment of the invention, it is preferred that a recess is provided beneath the measuring tube for a lateral guiding of the measuring tube. Quite especially preferred, the recess is provided beneath the measuring tube in the central region of the measuring tube.

In another preferred embodiment of the invention, it is provided that the measuring transducer is manufactured in PolyMUMPS technology. Quite especially preferred is a Poly1 base layer of the measuring tube, wherein, on the Poly1 layer, two Poly1-Poly2 via-layers are provided, which form the side walls of the measuring tube. A Poly2 layer forms, preferably, the roof of the measuring tube, wherein an Oxide2 layer is provided, which is removed by an etching step, in order to form the canal of the measuring tube.

BRIEF DESCRIPTION OF THE DRAWINGS

The invention will now be explained in greater detail on the basis of the drawing, the figures of which show as follows.

DETAILED DISCUSSION IN CONJUNCTION WITH THE DRAWINGS

Figure 1:
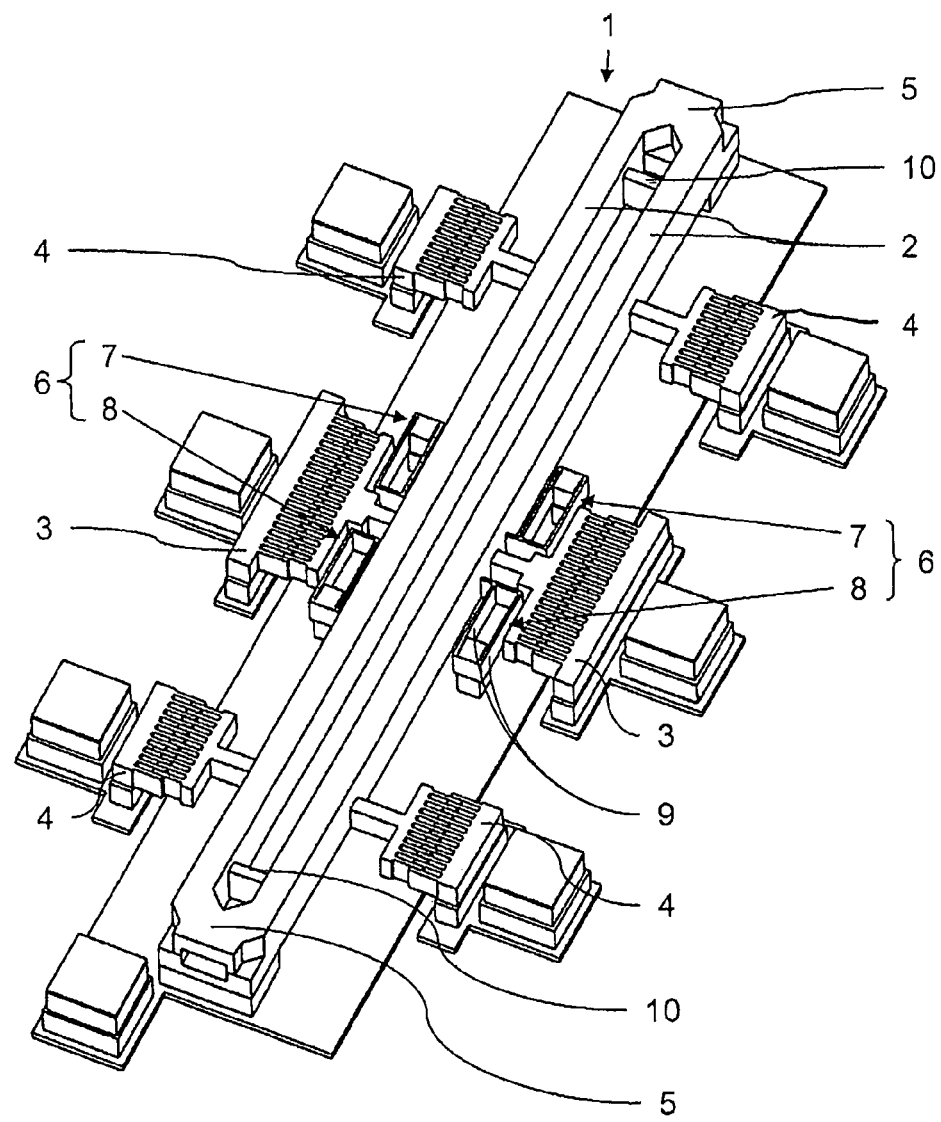
FIG. 1 is a measuring transducer of vibration type according to a preferred form of embodiment of the invention, in a perspective, plan view.

As can be seen from FIG. 1, a measuring transducer of the vibration type 1 according to the preferred example of an embodiment of the invention includes two straight measuring tubes 2, two oscillation exciters 3 and four oscillation pickups 4. The measuring transducer of the vibration type 1 is manufactured in PolyMUMPS technology, wherein the length of the measuring tube amounts to 2,660 µm. The two measuring tubes 2 are joined together at their respective ends, in each case, with a coupling piece 5 and connected with a pipeline (not shown). As additionally to be seen in FIG. 1, the measuring tubes 2 are supported oscillatably at the two coupling pieces 5.

According to PolyMUMPS technology, the measuring tubes 2 are manufacturable according to a wafer bonding method, wherein an anodic bonding method is used, in order to manufacture the coupling pieces 5, thus connecting the tubes 2 with the pipeline. The inlets and outlets of the measuring tubes 2 can be implemented by means of an etching method. The transition to the pipeline can be implemented by means of Pyrex 7740 glass connections, which are bonded with a silicon substrate of the measuring tubes 2 at a voltage of 500 V to 1000 V and a temperature of 260° C. to 400° C. Additionally, the coupling pieces 5 are embodied as reservoirs, so that a thermal expansion of the measuring tubes 2, especially due to a temperature gradient in the measuring transducer of vibration type 1, can be compensated.

In the central region of the measuring tubes 2, two oscillation exciters 3 are provided, which are embodied in the form of electrostatic comb drives. In order to achieve an optimum power efficiency and a maximum lateral oscillatory deflection of the measuring tubes 2, a sinusoidal voltage is applied to the electrostatic comb drive, so that the measuring tubes 2 oscillate, on the one hand, at their resonance frequency and, on the other hand, with opposite phase, in order to have a balanced system. As further shown in FIG. 1, a first oscillation exciter 3 is arranged on the one side of the measuring tubes 2 and a second oscillation exciter 3 on the other side of the measuring tubes 2 in such a manner that the measuring tubes 2, the first oscillation exciter 3 and the second oscillation exciter 3 lie in a plane.

Further provided is a damping system 6 for influencing the stiffness of the measuring tube 2. The damping system 6 is arranged in the central region of the measuring tube 2, wherein a first part 7 of the damping system is arranged on the one side of the oscillation exciter 3 and a second part 8 of the damping system is arranged on the other side of the oscillation exciter 3. The first part 7 of the damping system 7 and the second part 8 of the damping system comprise essentially two mutually spaced, parallel leaf springs 9, which are arranged parallel to the measuring tube 2, so that the mutually spaced, parallel leaf springs 9 are connected at one end with the measuring tube 2 and at another end with a region arranged secure against oscillation relative to the measuring tube 2.

The measuring transducer of the vibration type 1 according to the preferred example of an embodiment of the invention further includes four oscillation pickups 4, which are embodied in each case as a comb structure with a capacitive sensor. As can be seen from FIG. 1, the oscillation pickups 4 are, in each case, arranged centrally between the oscillation exciter 3 and the end of the measuring tubes 2.

Finally, two connecting means 10, in each case secured to the two measuring tubes 2 and connecting the two measuring tubes 2, are provided for establishing the oscillatable length of the measuring tubes 2, wherein the connecting means 10 are arranged in end regions of the measuring tubes 2.

In the above described embodiment of the invention, to be noted, in each case, is the doubled embodying of, respectively, the oscillation exciter 3 and the oscillation pickups 4, the latter in the regions of inflow and outflow. By this doubled embodying, the measuring transducer of the vibration type exhibits two planes of symmetry. Of course, in each case, one oscillation exciter, and, in each case, one oscillation pickup in the inflow and in the outflow regions are sufficient for an adequate measuring transducer. By the doubled embodying, redundance is assured, both with respect to the accuracy of measurement as well as with respect to an assurance of correct functioning of the measuring transducer in the case of failure of one of the two oscillation exciters or one of the two oscillation pickups.

Figure 2:
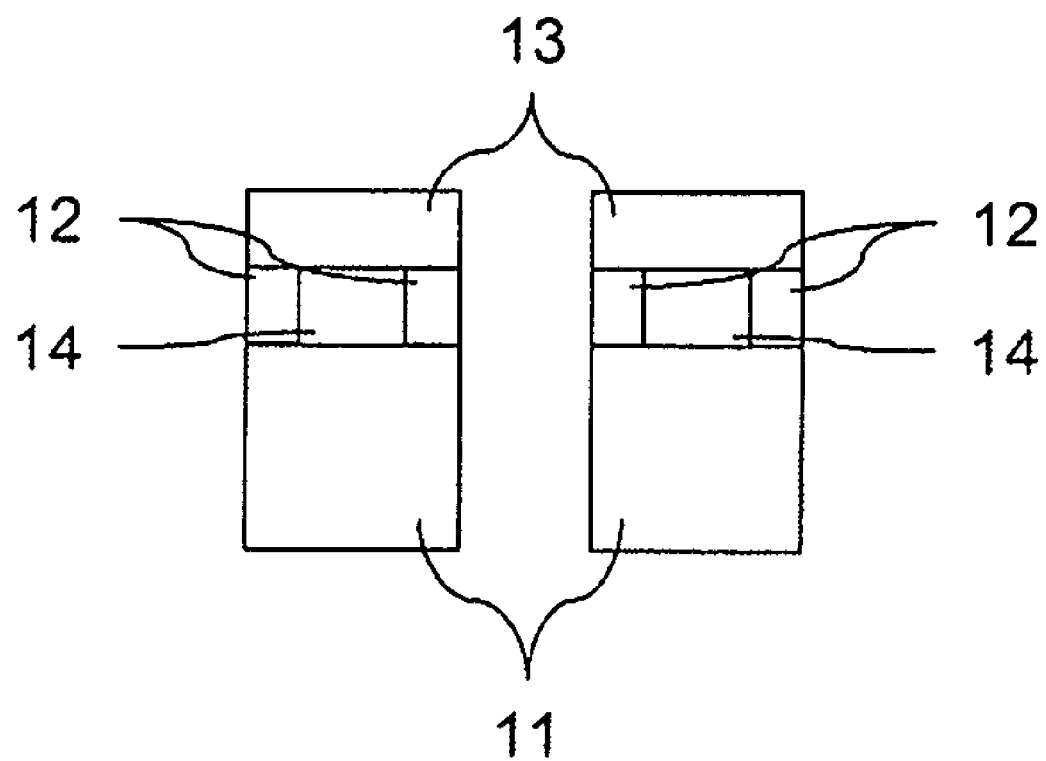
FIG. 2 are two measuring tubes according to the preferred example of an embodiment of the invention, in a sectional view.

As shown in FIG. 2, the measuring tube 2 includes a base layer, which is constructed of a Poly1 layer 11. Arranged on the Poly1 layer are two Poly1-Poly2, via layers 12, which form the side walls of the measuring tube. The roof of the measuring tube 2 is formed by a Poly2 layer 13. An Oxide2 layer 14 is provided for forming the canal of the measuring tube 2, wherein the Oxide2 layer 14 is etched away by a later manufacturing step of the PolyMUMPS manufacturing process. The Poly1 layer 11, which forms the base layer of the measuring tube 2, is 27 µm wide, 660 µm long and has a thickness of 2 µm. The height of the Poly1-Poly2 via layer 12 amounts to 0.75 µm, which is also the height of the Oxide2 layer 14. The height of the Poly2 layer 13 amounts to 1.5 µm.

In order to measure a mass flow of a flowing medium with the measuring transducer of the vibration type 1 according to a preferred embodiment of the invention, the measuring tubes 2 are caused to execute oscillations at their resonance frequency by means of the oscillation exciter 3 by supply of a sinusoidal voltage. The lateral shifting of the measuring tubes 2 is measured by the measuring pickups 4, wherein the mass flow is ascertained by measuring a phase difference between the sinusoidal voltages which are measured at a first oscillation pickup 4 and a second oscillation pickup 4, wherein the first oscillation pickup 4 is provided in a first upper region of the measuring tube 2 and the second oscillation pickup 4 is provided in a lower region of the measuring tube 2. In order to increase the sensitivity of the signals measured by the oscillation pickups 4, the length of the measuring tube 2 can be increased, in order, therewith, also to increase the separation between the first oscillation pickup 4 and the second oscillation pickup 4. Additionally, by increasing the width of the canal of the measuring tube 2, the oscillation constant of the lateral oscillation of the measuring tube 2 is increasable.

The invention claimed is:

1. A MEMS measuring transducer for measuring a mass flow of a flowing medium, comprising:
   two straight measuring tubes for conveying the medium,
   said measuring tubes being arranged in parallel to one another,
   an oscillation exciter arranged in a central region on said measuring tubes and embodied in such a manner that said measuring tubes can be caused to execute lateral oscillations; and
   at least one oscillation pickup, wherein:
   the oscillation exciter is embodied as an electrostatic comb drive; and/or
   the at least one oscillation pickup is embodied as a comb structure including a capacitive sensor; and
   the measuring transducer is manufactured using a MEMS process.

2. The measuring transducer as claimed in claim 1, wherein:
   said measuring tubes are joined at their respective ends, in each case, with a coupling piece and thereby connected with a pipeline.

3. The measuring transducer as claimed in claim 2, wherein:

said measuring tubes are held oscillatably at said two coupling pieces.

4. The measuring transducer as claimed in claim 2, wherein:
said coupling pieces are embodied as a reservoir.

5. The measuring transducer as claimed in claim 1, further comprising:
a connecting means secured to said two measuring tubes and connecting said two measuring tubes for establishing an oscillatable length of said measuring tubes; and
said connecting means is arranged in an end region of said measuring tubes.

6. The measuring transducer as claimed in claim 1, further comprising:
a damping system for influencing the stiffness of said measuring tubes.

7. The measuring transducer as claimed in claim 1, wherein:
a recess is provided beneath said measuring tubes for lateral guiding of said measuring tubes.

8. The measuring transducer as claimed in claim 1, wherein:
said measuring transducer is manufactured in Poly-MUMPS technology.

9. A MEMS measuring transducer for measuring a mass flow of a flowing medium, said measuring transducer comprising:
a measuring tube for conveying the medium; and
an oscillation exciter adapted to execute said measuring tube to oscillate laterally; wherein:
the oscillation exciter is embodied as an electrostatic comb drive; and
the measuring transducer is manufactured using a MEMS process.

10. The measuring transducer as claimed in claim 9, further comprising:
at least one oscillation pickup.

11. The measuring transducer as claimed in claim 10, wherein:
the at least one oscillation pickup includes a capacitive sensor.

12. The measuring transducer as claimed in claim 10, wherein:
the at least one oscillation pickup is embodied as a comb structure with a capacitive sensor.

13. A MEMS measuring transducer of the vibration type for measuring a mass flow of a flowing medium, said measuring transducer comprising:
a measuring tube for conveying the medium;
an oscillation exciter adapted to execute said measuring tube to oscillate laterally; and
at least one oscillation pickup, wherein:
the at least one oscillation pickup is embodied as a comb structure including a capacitive sensor; and
the measuring transducer is manufactured using a MEMS process.

14. The measuring transducer as claimed in claim 13, wherein:
the oscillation exciter is arranged in a central region on said measuring tube.

15. A MEMS measuring transducer for measuring a mass flow of a flowing medium, comprising:
two straight measuring tubes for conveying the medium;
a damping system for influencing the stiffness of said measuring tube;
an oscillation exciter; and
at least one oscillation pickup, wherein:
said measuring tubes are arranged in parallel to one another;
said damping system is provided in the central region of said measuring tubes in such a manner that a first part of said damping system is arranged on one side of said oscillation exciter on said measuring tubes and a second part of said damping system is arranged on the other side of said oscillation exciter on said measuring tubes; and
the measuring transducer is manufactured using a MEMS process.

16. The measuring transducer as claimed in claim 15, wherein:
said first part of said damping system and said second part of said damping system each comprise two parallel plates spaced from one another;
said plates are connected at one end in such a manner with one of said measuring tubes, that the plates are arranged parallel to said measuring tubes; and
said plates are connected at an opposed end with a region secure against oscillation relative to said measuring tubes.

* * * * *